US012212037B2

(12) United States Patent
Stekr et al.

(10) Patent No.: US 12,212,037 B2
(45) Date of Patent: Jan. 28, 2025

(54) ADJUSTABLE ANTENNA MOUNTING SYSTEM

(71) Applicant: PERFECTVISION MANUFACTURING, INC., Little Rock, AR (US)

(72) Inventors: Scott Stekr, Littleton, CO (US); Dominic Newnham, Centennial, CO (US)

(73) Assignee: PERFECTVISION MANUFACTURING, INC., Little Rock, AR (US)

( * ) Notice: Subject to any disclaimer, the term of this patent is extended or adjusted under 35 U.S.C. 154(b) by 0 days.

(21) Appl. No.: 18/235,827

(22) Filed: Aug. 19, 2023

(65) Prior Publication Data

US 2023/0402735 A1 Dec. 14, 2023

Related U.S. Application Data

(63) Continuation of application No. 17/571,177, filed on Jan. 7, 2022, now Pat. No. 11,735,805.

(51) Int. Cl.
*H01Q 1/12* (2006.01)

(52) U.S. Cl.
CPC ......... *H01Q 1/1264* (2013.01); *H01Q 1/1228* (2013.01)

(58) Field of Classification Search
CPC ........................... H01Q 1/1264; H01Q 1/1228
See application file for complete search history.

(56) References Cited

U.S. PATENT DOCUMENTS

| | | | | |
|---|---|---|---|---|
| 9,634,373 | B2 * | 4/2017 | Lee | H01Q 19/022 |
| 2016/0211569 | A1 | 7/2016 | Skrepcinski | |
| 2016/0294036 | A1 | 10/2016 | Christie | |
| 2016/0322697 | A1 | 11/2016 | Skrepcinski | |
| 2017/0264005 | A1 | 9/2017 | Roy | |
| 2018/0083337 | A1 | 3/2018 | Roy | |
| 2020/0094086 | A1 | 3/2020 | Stekr | |
| 2022/0052433 | A1 | 2/2022 | Klein | |
| 2022/0085481 | A1 | 3/2022 | Severin | |
| 2022/0190462 | A1 | 6/2022 | Campbell | |

* cited by examiner

*Primary Examiner* — Awat M Salih
(74) *Attorney, Agent, or Firm* — Paul D. Chancellor; Ocean Law

(57) ABSTRACT

An antenna mounting system includes clamps, transition pieces, X-Frames, corner braces, providing for rotation of the X-Frames.

10 Claims, 10 Drawing Sheets

ADJUSTABLE ANTENNA MOUNTING SYSTEM

PRIORITY CLAIM

This application is continuation of U.S. patent application Ser. No. 17/571,177 filed Jan. 7, 2022 and entitled Adjustable Antenna Mounting System.

FIELD OF THE INVENTION

The present invention relates generally to mount or brackets for antenna components. More particularly, the present invention relates to mounts and brackets which facilitate the attachment of antennas or related components to wireless communication towers or other similar structures.

BACKGROUND OF THE INVENTION

Wireless data and voice communications services have become ubiquitous in modern society. In order to transmit the signals necessary to facilitate these services, there is a need for antennas to both transmit and receive the wireless signals. These antennas must be situated high above the ground and properly positioned in order to optimize signal transmission. Additionally, because of the increasing utilization of wireless communications, the number of antennas used per tower is increasing, as are the size of the antennas being mounted.

With the increasing number of antennas being used, the efficient configuration of them has become more important. Further, the increasing size and weight of the antennas being attached places a greater importance on the integrity and stability of the mounting system for purposes of both safety and signal quality. Accordingly, it is desirable to provide a mount system which provides for the attachment of more antennas while providing adjustment to the mount to properly orient the antennas.

SUMMARY OF THE INVENTION

The present invention is a system for mounting wireless communication antennas to tower structures. The system consists of clamps for attaching to the tower structure, support frame members, antenna attachments members, and an azimuth adjustment guide. The invention also consists of tying members through which three or more mounts may be connected together in a 360 degree, triangular configuration.

The object of the present invention is to provide a mounting system for attaching wireless antennas and related components to a tower or similar structure. The system may be used singularly or may be combined with two additional units in a three or more sided, 360 degree configuration. When placed, the mounting system will have a range of azimuth adjustment to properly orient the antennas to be mounted.

It is a further object of this invention to provide a system of multiple antenna mounts which are rigidly connected together at points adjacent to location at which the mounts attach to the tower for added stability of the mounting systems.

It is a further object of this invention to provide a mounting system for which the mounting bracket which attaches to the tower structure is configured in such a way to accommodate and firmly attach to tower members of multiple shapes and sizes.

It is a further object of this invention to provide a mounting bracket which is adjustable in multiple directions and which may be adjusted after the bracket is firmly secured to the tower structure.

It is a further object of this invention to provide an antenna mounting system which is simple to manufacture, stronger than existing systems, and which is simple to assemble in the field by the installer.

The advantages of the present invention include that it is adaptable to many shapes and sizes of tower structure, imparts less stress on tower components, is simple to manufacture and assemble, and provides a dedicated attachment location for tower technicians.

These, and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE PREFERRED EMBODIMENT

Figure 1:
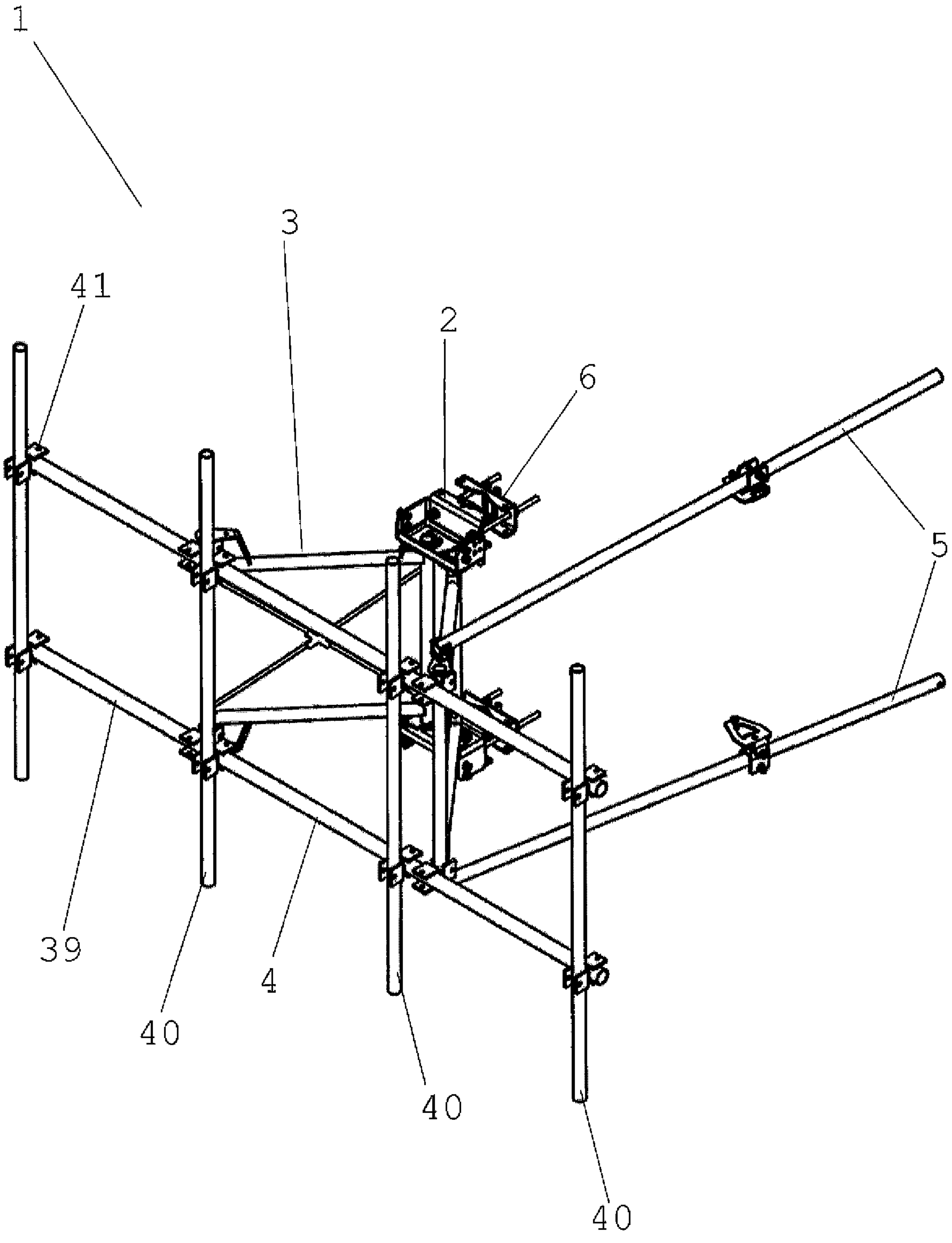
FIG. 1 is a frontal isometric view of a single mounting system.
Figure 2:
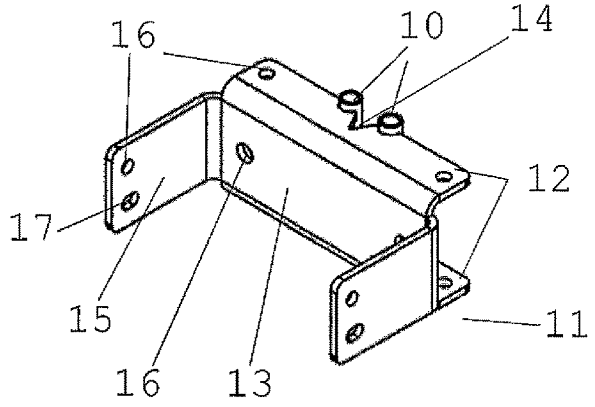
FIG. 2 is an isometric view the front clamp component.
Figure 3:
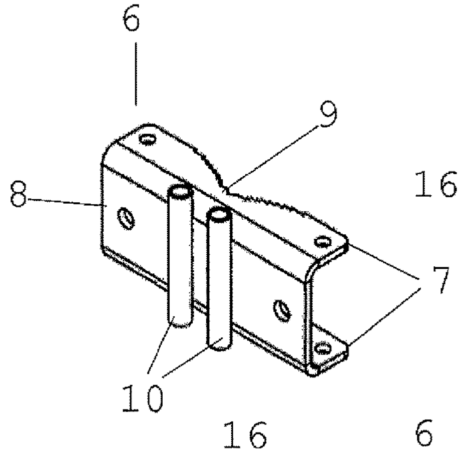
FIG. 3 is an isometric view of rear clamp component.
Figure 17:
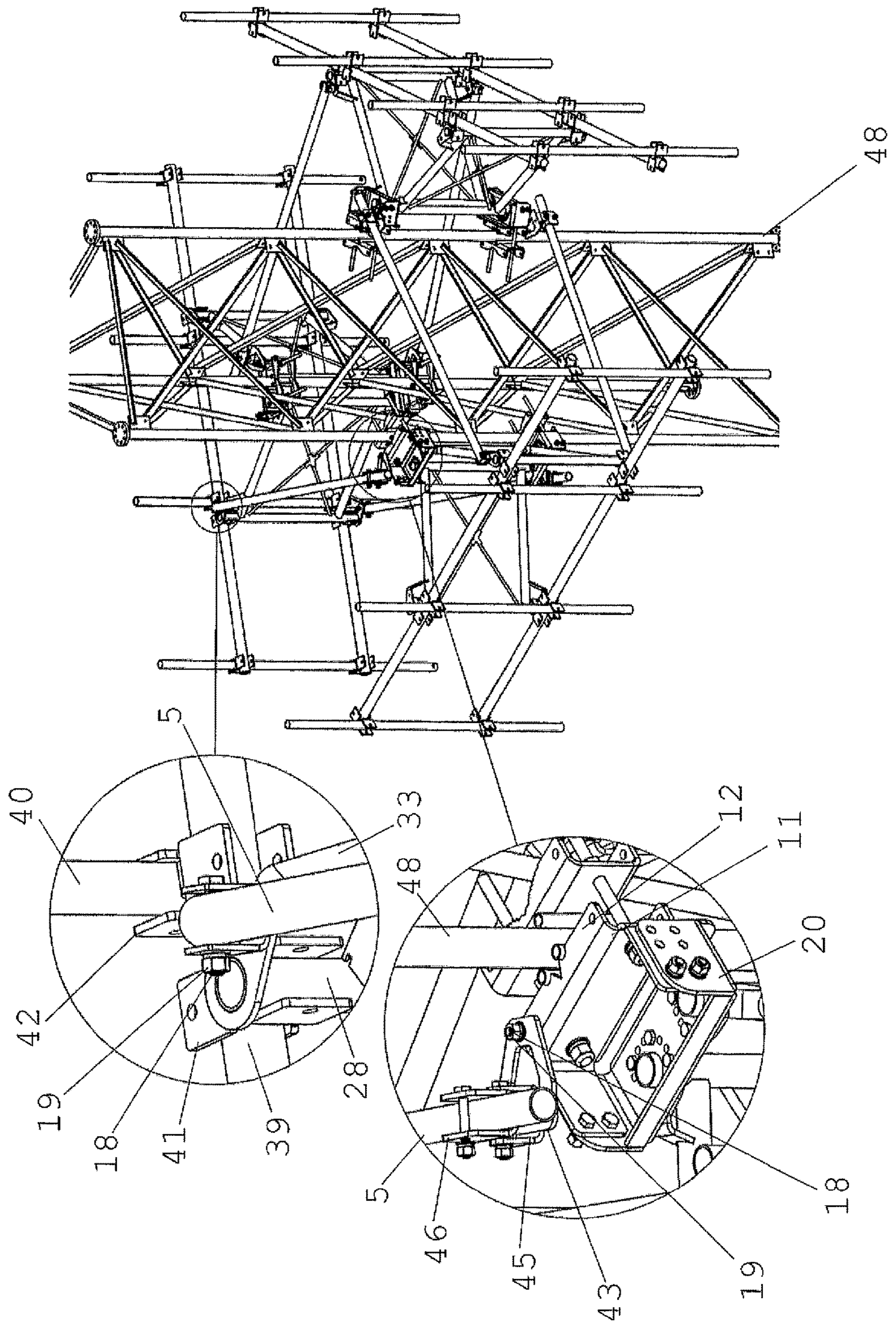
FIG. 17 is a frontal isometric view of three mounting systems attached to a tower with enlarged views showing connection of tying members between mounting systems.

Referring to the drawings, FIGS. 1 and 17 depict an antenna mounting system 1 featuring two mounting clamps 2, two x frames 3, plurality of attachment members 4, and a plurality of tying members 5. Referring specifically, to FIG. 17, multiple mounting systems may be attached together via tying members 5 which attach the systems via mounting clamps 2.

Figure 4:
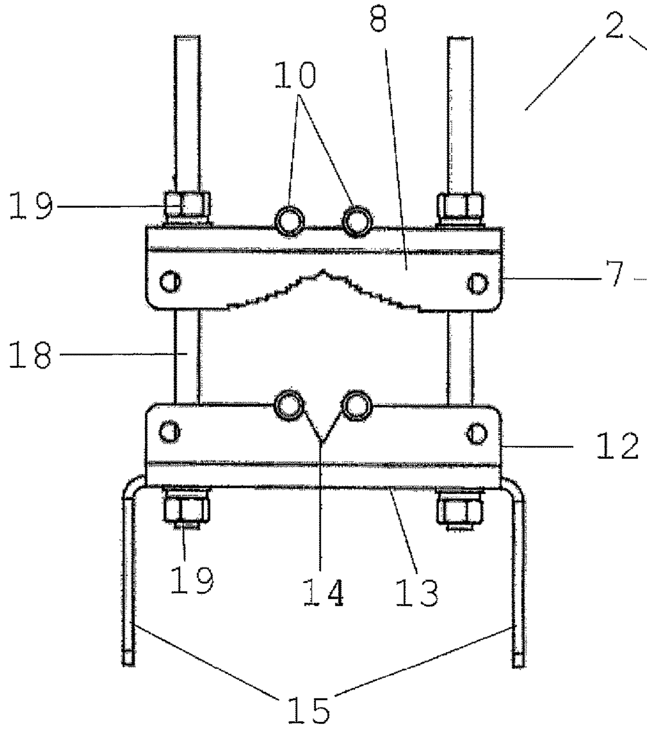
FIG. 4 is a top view of the clamp.

Referring to the drawings, FIG. 4 depicts the mounting clamp 2 in its pre-assembled state. The mounting clamp comprises a rear clamping component 6 and a front clamping component 11. The front and rear clamping components are preferably made of metal. The rear clamping component 6 comprises two rear tower contact lobes 7 which extend perpendicular from the main plane 8 of the rear clamping component 6 and extend axially toward the front clamping component 11 when the mounting clamp 2 is in its pre-assembled state. The rear tower contact lobes 7 feature a notch 9, which may be serrated, configured to contact and grip the tower structure 48 to which the mounting clamp 2 is attached. The rear tower contact lobes 7 may also feature attachment holes 16. The rear clamping component 6 may also feature round contact members 10 affixed to the main plane 8 on the opposite side of the notch 9 of the rear clamp component 6.

Figure 5:
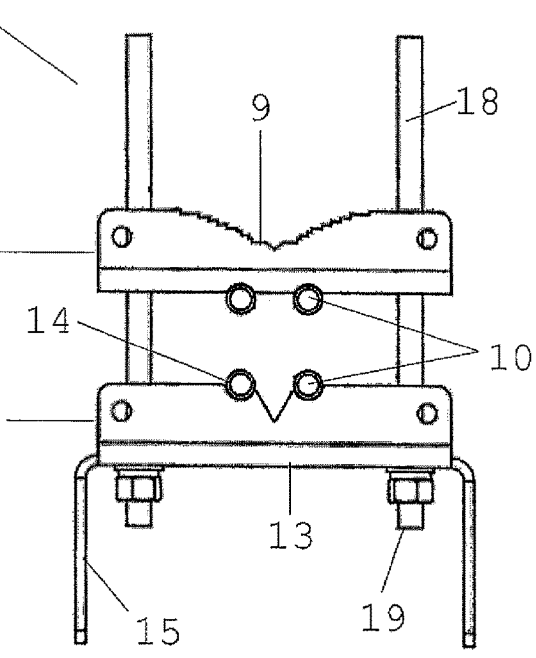
FIG. 5 is top view of an alternate configuration of the clamp.

Referring to the drawings, FIG. 5 depicts the mounting clamp 2 in an alternate configuration in which the rear clamp component 6 is rotated 180 degrees from the orientation shown in FIG. 4. In this alternate orientation, the round contact members 10 are oriented such that they extend off of the main plane 8 of the rear clamping component 6 toward the front clamping component 11 when the mounting clamp 2 is in this alternate pre-assembled state. In this alternate configuration, the round contact members are configured to contact and grip the tower structure 48 to which the clamp is attached.

The front clamping component 11 comprises two front tower contact lobes 12 which extend perpendicular from the main plane 13 of the front clamping component 11 and extend axially toward the rear clamping component 6 when the mounting clamp 2 is in its preassembled state or alternate pre-assembled state. The front tower contact lobes 12 feature a v-notch 14 configured to contact and grip the tower structure 48 to which the mounting clamp 2 is attached. The front tower contact lobes 12 may also feature attachment holes 16. The front clamping component 11 also comprise round contact members which are oriented perpendicular to the contact lobes 12 and located immediately proximate the v-notch 14. The round elements are configured such that they may contact and grip the tower structure 48 to which the mounting clamp 2 is attached. The front clamping component 11 also features mounting tabs 15 located on each end of the front clamping component. The mounting tabs 15 are configured at a 90 degree angle from the main plane 13 of the front clamping component 11 and extend to the opposite side of the plane 13 from the front tower contact lobes 12. The mounting tabs 15 may feature one or more attachment holes 16 as well as a tilt adjustment slot 17.

The front and rear clamping components both feature a plurality of attachment holes 16 on their main planes 13, 8 and are preferably connected through a plurality of bolts 18 and nuts 19.

Figure 6:
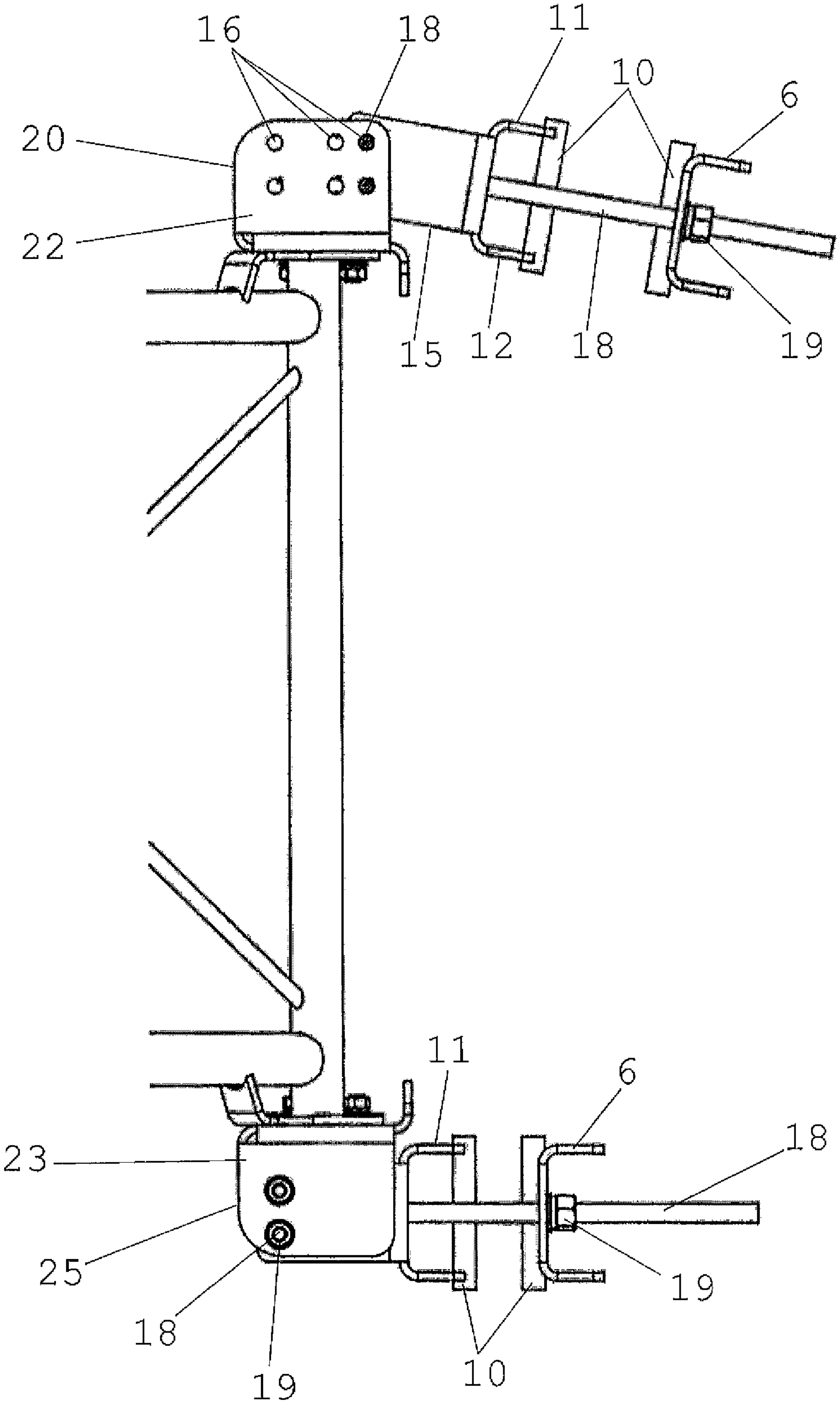
FIG. 6 is a right side view of the clamp attachment to the X-frame.
Figure 7:
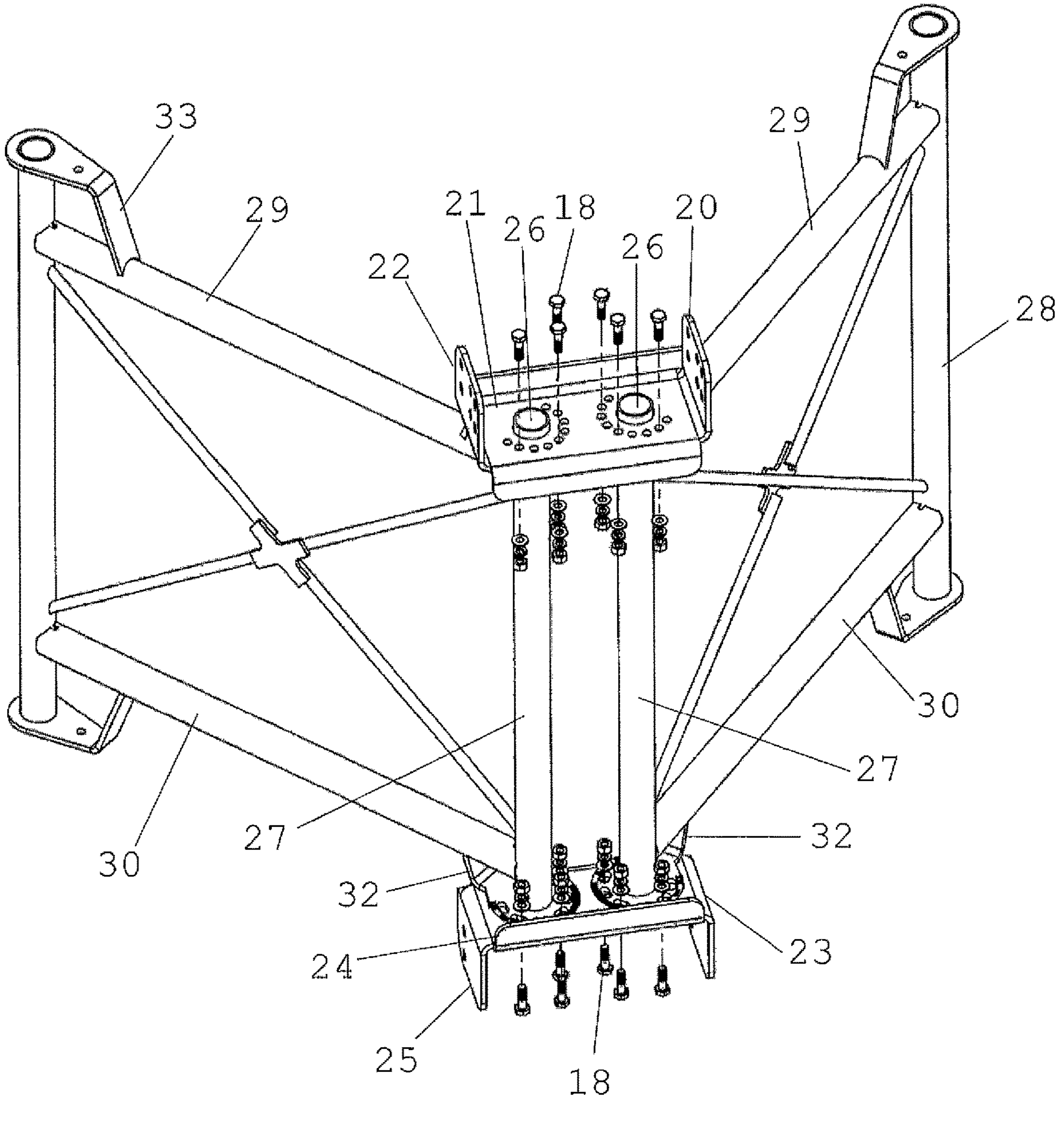
FIG. 7 is a rear isometric view of the X-frame attachment to the transition weldments.

Referring to the drawings, FIGS. 6 and 7 depict the mounting clamps 2 attached to the X-frame 3. The mounting clamps 2 further comprise an upper transition weldment 20 and a lower transition weldment 23. The upper transition weldment 20 comprises a main plane 21 and attachment plates 22 located at each end of the main plane 21 and which extend perpendicular to the main plane 21. The attachment plates feature a number of attachment holes 16. The main plane features two circular X-frame attachment holes 26 and a plurality of attachment holes 16 located proximate the X-frame attachment holes and oriented concentrically around them. The main plane 21 may also feature azimuth reference markers 37.

The lower transition weldment 23 comprises a main plane 24 and attachment plates 25 located at each end of the main plane 24 and which extend perpendicular to the main plane 24. The attachment plates feature a number of attachment holes 16. The main plane 24 features two circular X-frame attachment holes 26 and a plurality of attachment holes 16 located proximate the X-frame attachment holes and oriented concentrically around them. The main plane 24 may also feature azimuth reference markers 37.

The upper transition weldment 20 may be pivotably bolted to the front clamp component mounting tabs 15 via attachment holes 16 and the tilt adjustment slots 17 of the mounting tabs 15. The upper transition weldment 20 should be configured, when attached to the mounting tabs, such that the attachment plates 22 extend upward relative to the main plane 21. The lower transition weldment 23 may be pivotably bolted to the front clamp component mounting tabs 15 via attachment holes 16 and the tilt adjustment slots 17 of the mounting tabs 15. The lower transition weldment 23 should be configured, when attached to the mounting tabs, such that the attachment plates 25 extend downward relative to the main plane 24.

Figure 8:
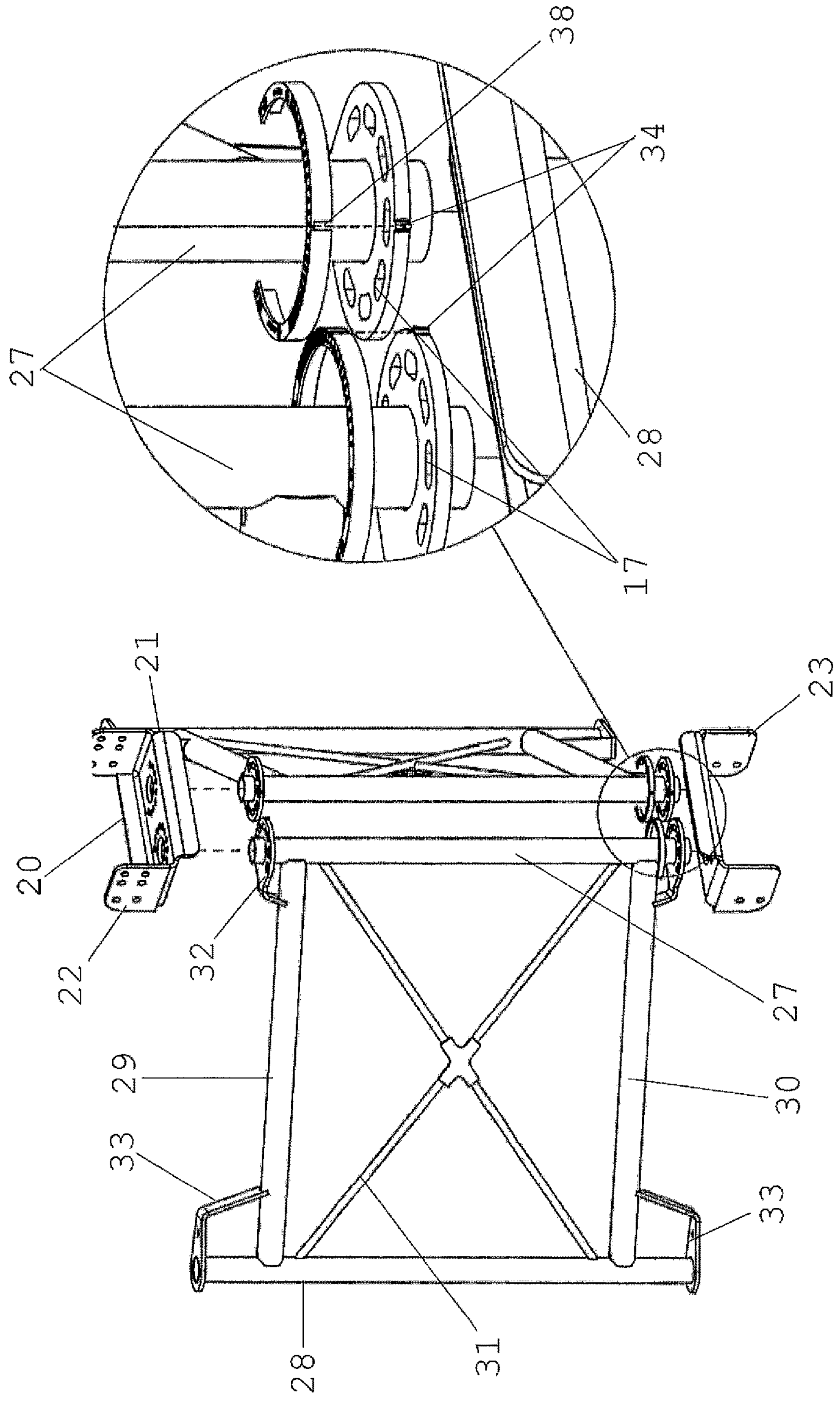
FIG. 8 is a rear isometric view of the X-frame attachment to the transition weldments with an enlarged view of the attachment to the lower transition weldments.

The mounting system 1 also features multiple X-frames 3. Referring to the drawings, FIGS. 7 and 8 depict the X-frames. The X-frames 3 are generally rectangular in shape and are preferably made of metal. The x-frames 3 comprise an inner vertical element 27, an outer vertical element 28, an upper lateral element 29 and a lower lateral element 30. The elements are affixed to one another and configured in a generally rectangular shape where the ends of the vertical elements extend beyond the lateral elements. The X-frame also features an x-member 31 affixed to the X-frame at the interior of the rectangle. The X-frame further features inner and outer braces 32, 33. The outer braces 33 are affixed to the end of the outer vertical element 28 and to a lateral member. Each X-frame will have an outer brace 33 connecting the upper end of the outer vertical element 28 to the upper lateral element 29 as well as an outer brace 33 connecting the lower end of the outer vertical element 28 to the lower lateral element 30. The outer braces may feature mounting holes 16.

The inner braces 32 are affixed to the end of the inner vertical element 28 and to a lateral member. Each X-frame will have an inner brace 32 connecting the upper end of the inner vertical element 27 to the upper lateral element 29 as well as an inner brace 32 connecting the lower end of the inner vertical element 27 to the lower lateral element 30. The portion of the inner brace shall be generally circular in shape and shall encircle the inner vertical element 27 where they are attached. The surface of the inner brace 32 features adjustment slots 17 which are oriented concentrically around the inner vertical element 27. The inner brace 32 also features a protrusion 34 on its end which is located such that it is positioned 180 degrees relative to the attachment of the lateral element 29, 30 to the inner vertical element 27. The lower brace 32 is also attached to the inner vertical element 27 such that a portion of the inner vertical element 27 extends beyond the inner brace 32.

Referring to the drawings, FIG. 7 depicts the assembly of the X-frames 3 to the upper and lower transition weldments 20, 23 of the clamps 2. The ends of the inner vertical element 27 are inserted into the X-frame attachment holes 26 of the upper and lower transition weldments 20, 23. The diameter of the inner vertical element 27 should be such that it may be inserted into the X-frame attachment holes. The mounting system 1 is assembled such that there are two X-frames 3 attached to the clamps 2.

Figure 9:
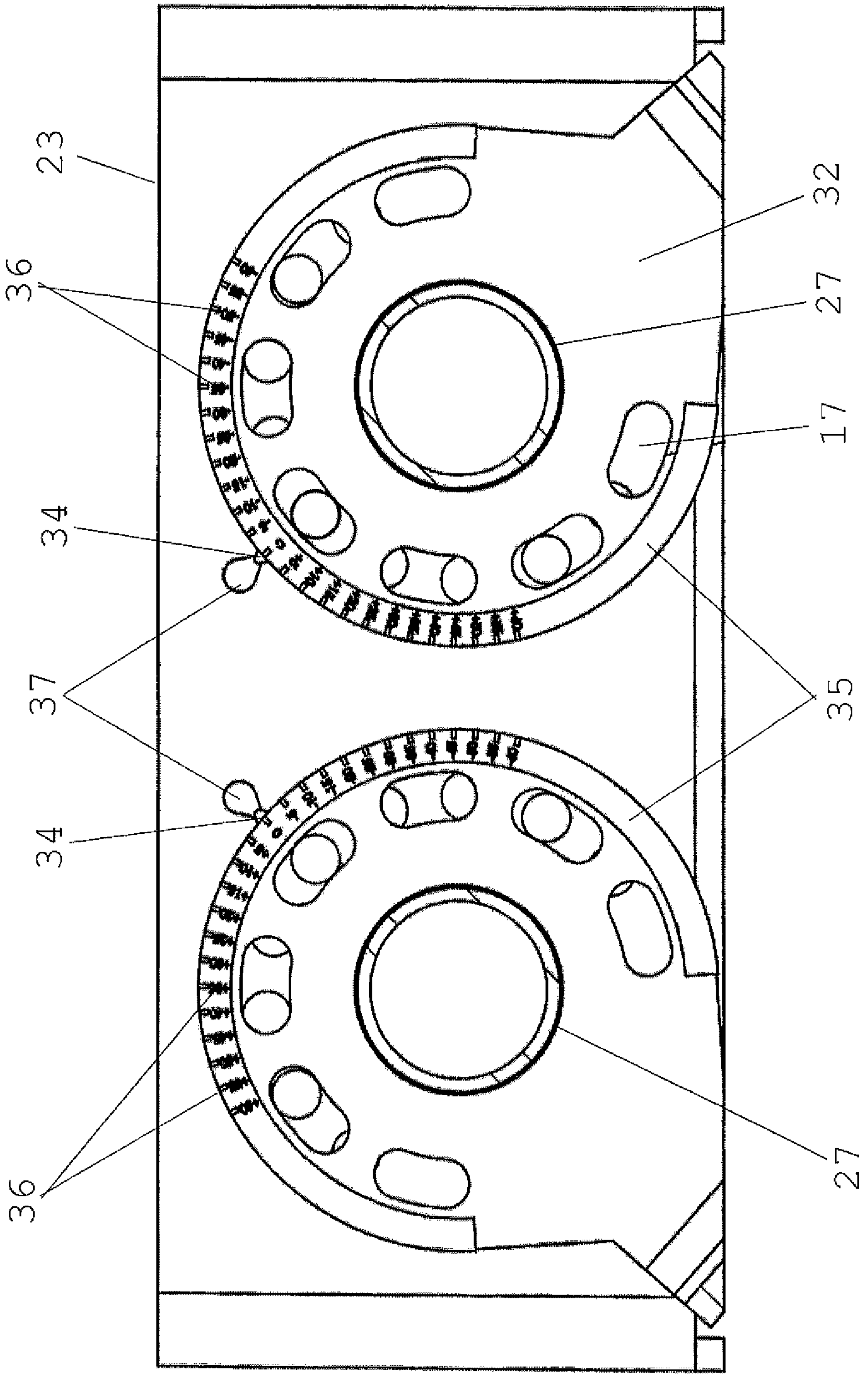
FIG. 9 is a top view of the lower transition weldment showing the X-frame and azimuth guide.

Referring to the drawings, FIGS. 8 and 9 depict the azimuth guide 35. The azimuth guide 35 is semi-rigid and shaped, generally, as a ¾ circle. Its cross-section is generally an inverted L shape. The azimuth guide 35 features an indexing notch 38 on its side which is generally located in the center of the ¾ circle shape. On the top, the azimuth guide 35 features a series of indicator marks 36. The indicator marks 36 are a series of hash marks spaced at regular intervals and span 120 degrees ranging from negative 60 degrees to positive 60 degrees with zero oriented in the center of the azimuth guide 35 and located directly above the indexing notch 38. The preferred embodiment has the indicator marks spaced at five degree intervals.

Figure 13:
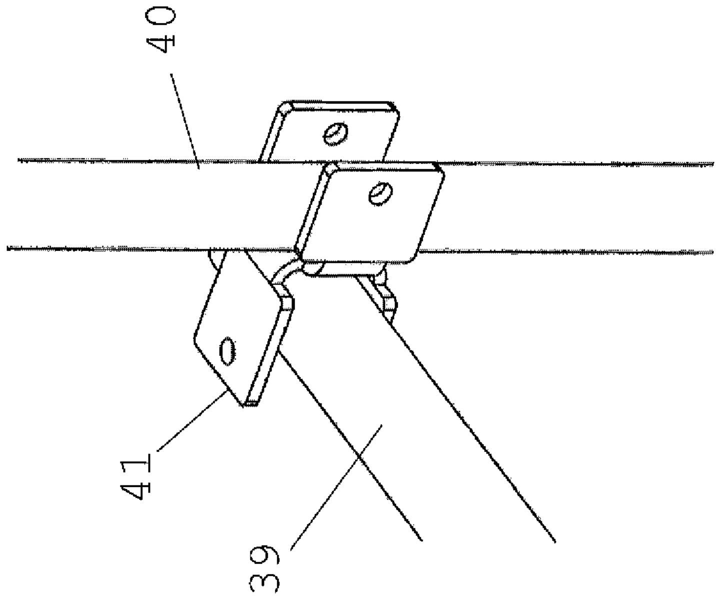
FIG. 13 is an isometric view of attachment members connected via a crossover bracket.
Figure 12:
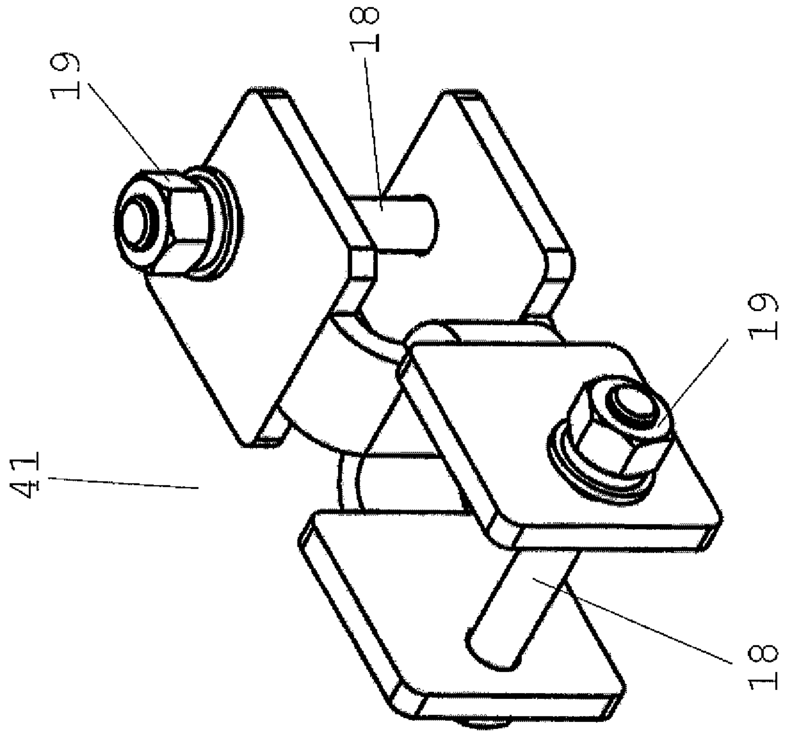
FIG. 12 is a front isometric view of the crossover bracket.

The mounting system 1 may also feature multiple attachment members 4. The attachment members 4 may consist of two horizontal members 39 which are attached to the outer vertical component 28 of the X-frame 3. The attachment members may also comprise a plurality of vertical members 40. The attachment members 4 are preferably metal tubes but may be made of any suitable rigid material. The horizontal members 39 preferably attach to the X-frame 3 outer vertical component proximate the outer braces 33. The mounting system 1 preferably features 2 horizontal members 39, but more may be used. The horizontal members 39 are oriented perpendicular to the outer vertical component 28 and are attached to the outer vertical component 28 via a crossover bracket 41. The crossover bracket is preferable shaped as shown in FIGS. 12 and 13 and comprises two opposing U-shaped brackets with attachment holes 16 which are oriented perpendicular one another. In this configuration, one end of the bracket 41 is secured around the outer vertical component 28 and secured, preferably with a bolt 18 and nut 19. The horizontal member is then secured in the other end of the bracket 41 and secured. In the preferred embodiment, each horizontal member is secured to both X-frames 3. One or more vertical members 40 are then attached to the horizontal members 39 via crossover brackets 41 in the same manner as the horizontal members 39 are attached to the X-frame. The vertical members are preferably oriented perpendicular to the horizontal members 39. It is also preferred that the vertical members 40 are attached to at least two horizontal members 39.

In the preferred embodiment, to use the mounting system 1, a mounting clamp 2 in the pre-assembled state as shown in FIG. 4 or 5 is attached to two X-frames 3. When the mounting system is assembled, two X-frames 3 should be attached to the clamps by inserting the ends of the inner vertical components 28 into the X-frame attachment holes 26 of the upper and lower transition weldments 20, 23 and oriented such that the protrusions 34 of the inner braces 32 align with the azimuth indicator marks 37 of the upper and lower transition weldments 20, 23. Then, the azimuth guides should be attached to the inner braces 32 which are proximate the lower transition weldment and placed such that the indexing notches 38 align with and fit over the protrusions 34. Next, the horizontal attachment members 39 should be attached to the X-frames and secured such that the span between the outer vertical elements 28 of the two X-frames 3 remains constant. The crossover brackets 41 should be attached to the outer vertical components 28 of the X-frame 3 such that the crossover brackets may rotate about the vertical elements 28. The vertical attachment members 40 should then be rigidly attached to the horizontal members 39. The assembled mounting system 1 is then attached to the tower member 48 by attaching the mounting clamps to the tower member such that the tower member is held by the contact lobes 7, 12 or round contact members 10 of the front and rear clamping components 6, 11.

Figure 11:
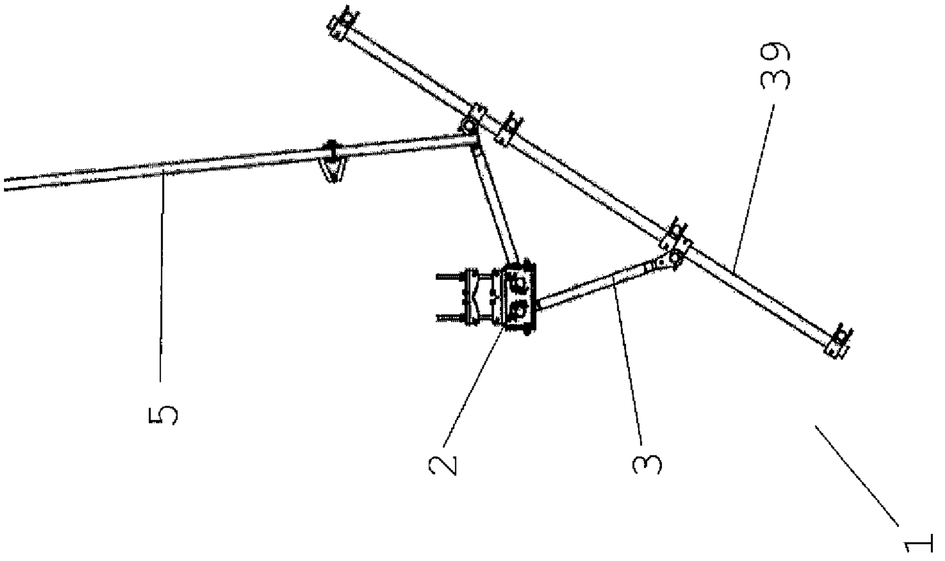
FIG. 11 is a top view of the mounting system pivoted −60 degrees off center.
Figure 10:
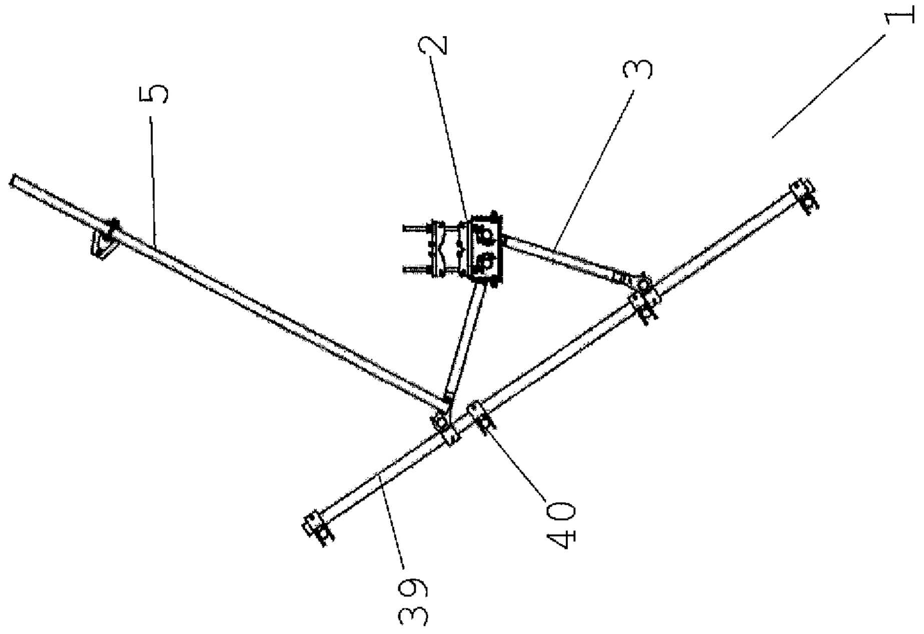
FIG. 10 is a top view of the mounting system pivoted +60 degrees off center.

Once attached to the tower 48, the azimuth may be adjusted by moving the attachment members 4 which are attached to the X-frames 3. As the attachment members 4 and X-frames 3 are moved, the inner vertical elements 27 of the X-frames 3, the inner braces 32 and the azimuth guides 35 should rotate in the X-frame attachment holes 26 of the upper and lower transition weldments 20, 23. As the inner braces 32 and azimuth guides 35 rotate, an operator may compare the indicator mark 36 on the azimuth guide 35 to the azimuth indicator mark 37 on the lower transition weldment to determine the azimuth adjustment. Once proper azimuth is set, the inner braces 33 may be rigidly affixed to the upper and lower transition weldments 20, 23. The preferred method of affixing the inner braces 33 to the transition weldments 20, 23 is via a plurality of bolts placed through the attachment holes 16 of the transition weldments 20, 23 and the adjustment slots 17 of the inner braces 33 and secured with nuts 19 on each bolt 18. As depicted in FIGS. 10 and 11, the X-frames 3 and attachment members 4 have an azimuth adjustment range of +/−60 degrees.

Figure 14:
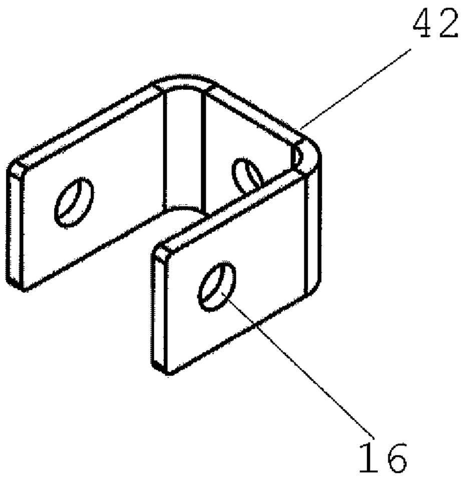
FIG. 14 is an isometric view of a pipe u-clip.
Figure 15:
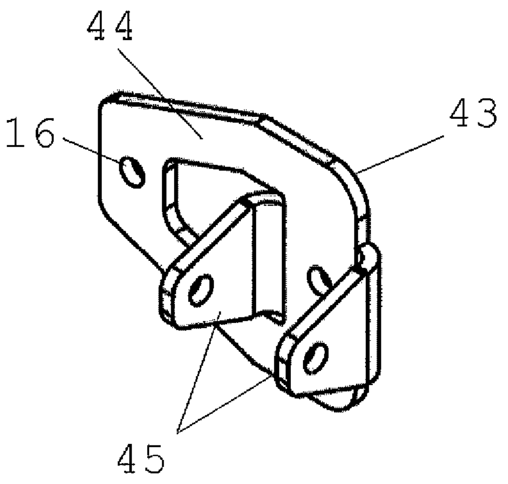
FIG. 15 is an isometric view of a pivot plate.

The preferred embodiment is configured such that the mounting system 1 may be used immediately adjacent to up to two more mounting systems on the same tower member 48. This configuration is specifically depicted in FIG. 17. The mounting systems are configured in a radial orientation about the same tower member 48 and may be configured such that three mounting systems form a triangular configuration. When multiple mounting systems are configured as such, they may also utilize tying members 5. The mounting system 1 may additionally feature one or more tying members 5 which are configured to connect adjacent mounting systems to one another. The tying members are preferably made of metal tubing, but any suitable rigid material may be used. The tying members may attach to the mounting system via pipe mount 42 or a pivot plate 43 with a pipe connection plate 46. The pipe mount 42 is a metal bracket with a general squared U shape and an attachment hole 16 at the bottom of the U and attachment holes on the sides as shown in FIG. 14. The pipe mount 42 may be affixed to any attachment hole 16 on any other component, but it is preferred that it be attached via a bolt 18 and nut 19 to an outer brace 33 of an X-frame 3 to the front or rear clamping elements 11, 6. The pipe mount may then be affixed to a tying member, preferably by a bolt placed through the attachment holes 16 of the mount 42 and through the tying member 5 and secured with a nut 19 as shown in FIG. 17.

Figure 16:
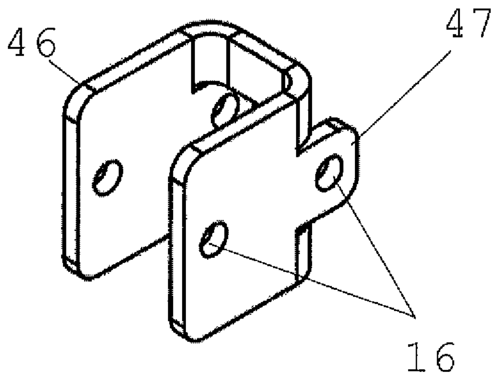
FIG. 16 is an isometric view of a pipe connection plate.

The pivot plate 43 comprises a main plane 44 a plurality of attachment holes 16 and a plurality of perpendicular elements 45 which extend up from the main plane 44. The perpendicular elements may each have attachment holes 16. The pipe connection plate 46 is generally a squared U shape with attachment holes 16 in the sides and also comprises two ears 47 which extend down from U shape as depicted in FIG. 16 and feature attachment holes 16. The pivot plate 43 is preferably assembled with the pipe connector plate 46 via a bolt 18 placed through the attachment holes of the perpendicular elements 45 and the ears 47 of the pipe connection plate and secured with a nut 19. The tying member is preferably secured to the pipe connection plate 46 by placing the tying member 5 adjacent to the bolt 18 connecting the pivot plate 43 to the pipe connection place 46. Then another bolt 18 is placed through the attachment holes of the pipe connection plate which will preferably be positioned on the other side of the tying member from the bolt securing the pivot plate 43 and the pipe connection plate 46. The referenced bolts should be secured with nuts. The preferred assembly of the pivot plate 43, pipe connection plate 46 and the tying member are depicted in FIG. 17. The pivot plate may then be affixed to any attachment hole 16 on any other component, but it is preferred that it be attached via a bolt 18 and nut 19 to an outer brace 33 of an X-frame 3 to the front or rear clamping elements 11, 6 on an adjacent mounting system.

The tying members are preferably oriented generally horizontally but may require some deviation from horizontal to connect elements which are situated at slightly different heights. The tying members may be rigidly attached to the X-frames 3 or mounting clamps 2 to connect adjacent mounting systems. In a configuration of three mounting systems 1, a total of three tying members are preferred such that each mounting system 1 is connected to both adjacent systems.

What is claimed is:

1. An antenna mounting system comprising:

one or more units, each unit comprising:

upper and lower clamps for attachment to an antenna tower, each clamp having front and rear clamping components;

each of the front and rear clamping components includes contact lobes with a notch, and plural first attachment holes;

at least one of the clamping components having round contact members at either side of the notch to grip the tower;

plural bolts configured to attach the front clamping component to the rear clamping component via the first attachment holes;

upper and lower transition pieces, each piece including an attachment plate, two X-frame bearing holes, an azimuth indicator, and plural second attachment holes;

the upper transition piece for attachment to the upper clamp and the lower transition piece for attachment to the lower clamp;

two X-frames rotatably supported by the upper and lower transition pieces, each X-frame including a rectangular or square outer frame with internal X-bracing and external corner bracing;

the rectangular or square outer frame including left and right members attached to upper and lower members, the right frame member being a post with opposed ends inserted in upper and lower X-frame bearing holes;

one of the corner braces having a flange that curves around the post, the flange or an attachment thereto for rotatable alignment with one of the azimuth indicators; and, plural horizontal attachment members attached to the X-frames and plural vertical attachment members supported by the plural horizontal attachment members.

2. The antenna mounting system of claim 1 further comprising cross-over brackets for attaching the horizontal attachment members to the X-frames.

3. The antenna system of claim 2 further comprising cross-over brackets for attaching the horizontal attachment members to the vertical attachment members.

4. The antenna mounting system of claim 3 further comprising tying bars between units where three units are mounted in a circular fashion around an antenna tower.

5. The antenna mounting system of claim 4 wherein ends of the tying bars are affixed to transition pieces.

6. An antenna mounting system comprising:

one or more units, each unit comprising:

upper and lower clamps for attachment to an antenna tower structure;

upper and lower transition pieces coupled to the upper and lower clamps, each transition piece with dual bearing holes;

inserted between the upper and lower transition pieces, first and second upright frames;

each frame having an inboard post connected to an arm extending therefrom for supporting one or more antennas; and, each post extending between and rotatably inserted in the bearing holes of the transition pieces;

wherein 1) the first frame has a first frame brace that interconnects the included arm and post, 2) an end of the brace forms a flange that curves around the post, and 3) when the frame it rotated to a particular degree, that setting is fixed by coupling the flange to an adjacent one of the transition pieces.

7. The antenna mounting system of claim 6 further comprising:

an azimuth guide ring in the form of a partial circle;

the azimuth guide ring curved around the curved flange;

slots in the curved flange; and, bolts for passing through a selected flange slot to fix the flange to the adjacent one of the transition pieces when an azimuth guide ring rotation indicates a desired frame rotation has been achieved.

8. The antenna mounting system of claim 6 wherein:

the first frame periphery includes an upper element, lower element where the lower element is the arm, left element, and right element where the right element is the first frame post;

an upper left brace extends between and interconnects the upper element and the left element, the brace having a flange that curves around the left element;

a lower left brace extends between and interconnects the arm and the left element, the brace having a flange that curves around the left element;

an upper right brace extends between and interconnects the upper element and the post, the brace having a flange that curves around the post; and, where no brace is captured within the frame periphery but on element portions that extend beyond the frame periphery.

9. The antenna mounting system of claim 6 wherein:

the two left elements of the two frames are interconnected with two horizontal members using four cross-over brackets, the interconnections being near the respective four braces; and, the two horizontal members are interconnected with four vertical members using four cross-over brackets, the interconnection of two of the vertical members being near the respective four braces.

10. The antenna mounting system of claim 6 wherein:

the antenna tower structure has a triangular cross section and there are three units are arranged in a circle around the structure;

the first unit utilizes a pair of tying members that attach it to the second unit;

the second unit utilizes a pair of tying members that attach it to the third unit;

the third unit utilizes a pair of tying members that attach it to the first unit; and, in each pair of tying members, a first tying member interconnecting an upper end of adjacent left elements and a second tying member interconnecting a lower end of adjacent left elements.

* * * * *